Apr. 24, 1923.
J. J. KOVACS
1,452,917
LENS GRINDER ATTACHMENT
Filed July 1, 1920
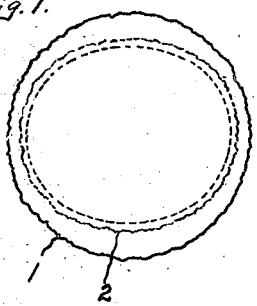
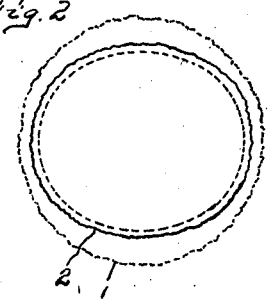
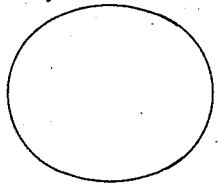
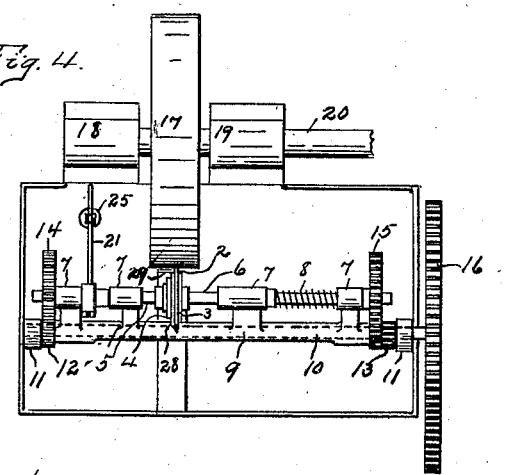
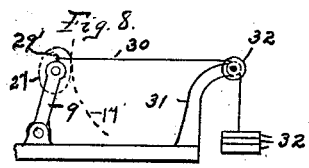
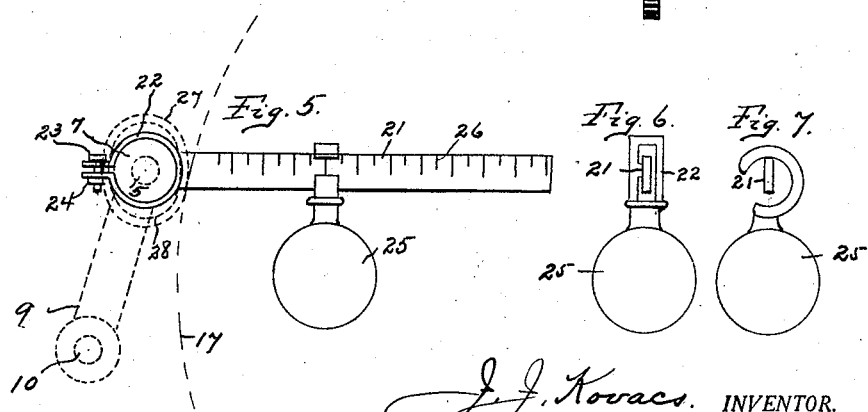

Patented Apr. 24, 1923.

1,452,917

UNITED STATES PATENT OFFICE.

JOSEPH J. KOVACS, OF ORANGE, NEW JERSEY.

LENS-GRINDER ATTACHMENT.

Application filed July 1, 1920. Serial No. 393,294.

*To all whom it may concern:*

Be it known that I, JOSEPH J. KOVACS, a citizen of the United States, residing in the city of Orange, county of Essex, and State of New Jersey, have invented a new and useful Improvement in Lens-Grinder Attachments, of which the following is a specification.

In the grinding of lenses for spectacles, it is the practice to grind the faces of the lens for correct convexity or concavity, the material being originally in a rough circular, disc form; thereafter the lens is shaped roughly to form by breaking off the edge or margin, so as to give the partially finished lens a general elliptical form; finally the lens is placed in what is known in the art as a lens edge grinder, in which the edge of the lens is finally ground to the exact shape for use as a spectacle lens.

In the machines now in general use, great care must be exercised in this edge grinding process. The lens with its unfinished edge, is accurately inserted in a rubber jawed, spring pressed lens chuck, and held with a yielding pressure against the face of a rotating grindstone. Means are also provided for slowly rotating the chuck with the lens therein, and such chuck is guided by a pattern of exactly the final shape which the lens is to take, but somewhat smaller. In grinding oval lenses it has been hitherto the practice to hold the lens against the stone by means of a coil contractile spring, one end of which is attached to some fixed part of the grinding machine, and the other end adjustably connected to some part of the rocking frame which carries the lens chuck. The objection to this form of mechanism resides in the fact that in order to properly grind the edge of an oval, or elliptical lens, this rocking frame is required to oscillate back and forth to a distance equal to the difference between the major and minor axes of the lens. This oscillation results in placing the contractile spring, above referred to, under greater tension as the major axis of the lens approaches contact with the grindstone, and it frequently follows that because of the resultant increased pressure the lens itself may be broken, or since it is held by friction alone between the rubber faces of the lens holding chuck, the lens itself is sometimes shifted from its place, if not completely forced out of the chuck. Again, because of this unequal pressure upon the edge of the elliptical lens the extremities of the major axis of the lens are more quickly ground than the extremities of the minor axis, resulting in a longer time required to complete the edge grinding process. Moreover the process as just described, requires the constant attention of an operative during the grinding process lest the lens be broken or shifted from its place, and also to properly adjust the tension of the spring as the grinding down to final form gradually progresses.

My present improvement resides in the substitution for the adjustable spring mechanism above described, of a lever with an adjustable weight thereon, so that no matter what part of the edge of the lens shall be in contact with the grindstone, the pressure between the edge of the lens and the stone shall be uniform. Furthermore, by the use of my improvement I am able to materially shorten the time required to grind the edge of a single lens. In some cases this time has been reduced by more than one-half, and in all cases by more than one-third. I am also able to completely obviate the breakage of lenses even under the most exacting conditions. And again, whereas under the old process the grinding of a lens required the constant attention of the operative, by my improvement the operative is required only to give his attention to the proper setting of the lens in the chuck, start the operation, and later when the grinding is about half completed readjust the weight upon the attachment, after which the grinding operation is completed without further attention. This gives the operative an opportunity to attend to five or six different grinding machines at the same time, whereas under the old system a single operative was required to give his entire attention to a single machine.

I have illustrated the several steps of lens edge grinding, and also my improvement in the accompanying drawings, wherein:

Fig. 1, represents a roughly, circular lens disc prior to rough shaping.

Fig. 2, illustrates the roughly shaped lens, and

Fig. 3, the completed lens.

Fig. 4, illustrates in part, so much of the usual grinding mechanism with my attachment secured thereto as is necessary to understand its use and operation.

Fig. 5, is a detached side view of my improved attachment showing the relative positions of the rocking chuck frame in dotted lines.

Fig. 6, is an end elevation of my improved attachment.

Fig. 7, is also an end elevation but shows a slightly modified form of weight.

Fig. 8, is a modified form of the device for producing a uniform pressure of the lens upon the stone.

Similar reference numerals refer to like parts throughout the specification and drawings The lens disc 1, as above described, is of roughly circular shape, with its faces corectly ground for convexity or concavity. The pattern of the finished lens is laid upon the face of the disc 1, and the projecting edge of the disc is broken away roughly down to the form illustrated in Fig. 2, at 2. In this form the roughly finished lens 2, is placed between the chucks 3, and 4, of the lens grinding machine. These rubber faced chucks are mounted respectively upon the spindles 5—6, the later being longitudinally slidable in the bearings 7, against a coil spring 8, said spring being utilized for forcing the spindle 6, and the chuck 3, with elastic pressure against one of the faces of the lens 2. The chuck frame 9, is mounted upon a shaft 10, which runs longitudinally therethrough, said shaft being mounted in journal bearings 11, upon the table of the machine. Near the ends of the shaft 10, just inside of the bearings 11, are the two pinions 12—13, which are respectively in engagement with the gear wheels 14 and 15, the latter being respectively mounted upon the chuck spindles 5 and 6. It will be noted that the pinion 13, is a double faced pinion to provide for the longitudinal shifting of the gear wheel 15, when the spindle 6 is shifted to open the chucks 3 and 4. The shaft 10, has a large gear wheel 16, by which it is driven. The grindstone 17, is mounted upon the shaft 20, carried in the bearings 18—19, and is driven by any external source of power.

It will be noted that the frame 9, being mounted upon the shaft 10, is free to oscillate within certain limits so as to carry the edge of the lens 2, against the face of the stone 17.

The structure thus far described is well known in the art, and its operation is common practice. As above noted, it is common practice to connect the upper part of the frame 9, as for example one of he bearings 7, by means of a coil spring to one of the bearings 18, or 19, so as to give the requisite pressure of the edge of the lens 2, against the face of the stone 17. As above described, the rotation of the lens against the stone is attended by the oscillation of the frame 9, upon the shaft 10, as the major and minor axes of the lens pass into contact with the face of the stone. This results in the placing of the coil spring, above described, under greater or less tension, with a consequent varying pressure upon the stone.

My present improvement consists in entirely dispensing with this connection and substituting therefor a weight arm 21, having a strap connection 22, for fastening the same to one of the chuck spindle bearings 7, with the arm 21, projecting forward toward the driving shaft 20. The strap connection 22, surrounds a portion of the bearing 7, and is rigidly fixed in place by means of the bolt 23, and nut 24. The arm 21, carries a weight 25, suspended therefrom and adjustable therealong. If desired the face of the arm 21, may be provided with a scale, as 26, so that the pressure due to the weight 25, upon the arm 21, may be accurately determined.

I have shown in Fig. 5, a large dotted oval 27. representing an elliptical lens, its major axis vertical and its minor axis horizontal. Within such large dotted lined oval, I also show a smaller dotted line oval 28, which represents the pattern, or exact final shape which the finished lens is to take. This pattern is shown in Fig. 4, in edge view at 28, as bearing upon the adjustable gauge 29, and its purpose is to limit the grinding of the edge of the lens to the exact shape of the pattern 28. This, however, is old in the art and forms no part of my invention.

It will be noted that with my improved attachment, the pressure between the lens 2, and the stone 17, under the influence of the weighted arm 21, is at all times the same, thereby preventing unequal grinding of the edge of the lens and thereby preventing breakage, or the forcing of the lens itself from its accurately adjusted position between the rubber faced chucks 3 and 4.

In Fig. 8, I have shown a slightly modified form of my improvement which accomplishes the same purpose. In this form I provide the machine table with a bracket 31; upon its rear side said bracket having a grooved roller at its upper extremity. Passing over this roller is a cable or chain 30, connected at its forward end by means of the hook 29', to the chuck frame 9. At the opposite end of the chain or cable 30, and suspended therefrom is a series of weights 32. It is obvious that the strain upon the chain or cable 30, due to the suspended weights 32, will maintain a uniform pressure of the edge of the lens 27, against the face of the stone 17. Should it be desired to increase this pressure more weights 32, could be added, and likewise if less pressure were required some of the weights 32, could be removed from the chain or cable 30.

By the use of my improvement I am able to accomplish the following results:

First: a more rapid grinding of each individual lens.

Second: reduction of breakage of lenses due to non-uniform pressure upon their edges.

Third: the shifting of the lens in the lens chuck is entirely obviated.

Fourth: the operative is relieved from constant attention to the machine during the grinding operation, so that he may be able to handle and keep in operation several machines simultaneously.

Fifth: a material reduction in the cost of lens making.

I claim:

An attachment for lens edge grinders comprising an arm having clamping means at one end thereof for rigidly but adjustably securing said arm in horizontal relation to the rocking frame of the lens grinder, and a weight adjustably suspended from said arm whereby the edge of a lens held upon said rocking frame may be caused to bear with uniform yielding pressure upon a grindstone during a complete revolution of said lens.

JOSEPH J. KOVACS.